(12) United States Patent
Vitek et al.

(10) Patent No.: US 11,879,559 B2
(45) Date of Patent: Jan. 23, 2024

(54) VENT VALVE FOR VENTING BORES OF VULCANIZATION MOLDS

(71) Applicant: GOTTSCHOL ALCUILUX CZ, SPOL. S R.O., Hulin (CZ)

(72) Inventors: Frantisek Vitek, Hulin (CZ); Michal Tomasek, Hulin (CZ)

( * ) Notice: Subject to any disclaimer, the term of this patent is extended or adjusted under 35 U.S.C. 154(b) by 740 days.

(21) Appl. No.: 16/976,756

(22) PCT Filed: Jan. 30, 2019

(86) PCT No.: PCT/CZ2019/000005
§ 371 (c)(1),
(2) Date: Aug. 30, 2020

(87) PCT Pub. No.: WO2020/125820
PCT Pub. Date: Jun. 25, 2020

(65) Prior Publication Data
US 2021/0010607 A1  Jan. 14, 2021

(30) Foreign Application Priority Data
Dec. 21, 2018 (CZ) .............................. CZ2018-732

(51) Int. Cl.
*F16K 24/04* (2006.01)
*B29C 33/10* (2006.01)
*B29D 30/06* (2006.01)

(52) U.S. Cl.
CPC .............. *F16K 24/04* (2013.01); *B29C 33/10* (2013.01); *B29D 30/0606* (2013.01); *B29D 30/0662* (2013.01); *B29D 2030/0617* (2013.01)

(58) Field of Classification Search
CPC ......... B29C 33/10; B29C 45/34; B29C 45/63; B29C 49/62; B29C 51/40;
(Continued)

(56) References Cited

U.S. PATENT DOCUMENTS

| 11,047,508 B2 * | 6/2021 | Sanders ................. F16K 24/04 |
| 2019/0255741 A1 * | 8/2019 | Hasseloef ............. B29C 33/10 |

FOREIGN PATENT DOCUMENTS

| CA | 2190720 A1 * | 5/1997 | ............. B29C 33/10 |
| CN | 106738495 A * | 5/2017 | ............. B29C 33/10 |

(Continued)

*Primary Examiner* — Hailey K. Do
(74) *Attorney, Agent, or Firm* — Patshegen IP; Moshe Pinchas

(57) ABSTRACT

The vent valve (10) for venting bores of vulcanization molds, which includes the sleeve (1), with the inner cylindrical hollow (1.1), ended with the valve conical hole (1.2) and the cylindrical hole (1.4) along the sides, whereas the sleeve (1) may be inserted into the vulcanization mold hole, the pin (2), movably located on the spring (3) in the inner cylindrical hollow (1.1), whereas the pin (2) contains the lower cylindrical part (2.4), ended in its lower part with the lower conical part (2.4.1), and the upper conical part in the upper part (2.4.2), the upper conical part (2.4.2) is followed by the central cylindrical part (2.5), followed by the connecting cylindrical part (2.6), whereas the diameter of the central cylindrical part (2.5) is smaller than the connecting cylindrical part (2.6) as well as the lower cylindrical part (2.4). The lower cylindrical part (2.4) and the central cylindrical part (2.5) are divided into four flexible legs (2.7) to (2.10), forming the flexible collet. Four flexible legs (2.7 to 2.10) are shaped identically and partially reach the connecting cylindrical part (2.6).

1 Claim, 4 Drawing Sheets

A-A

Figure 3:
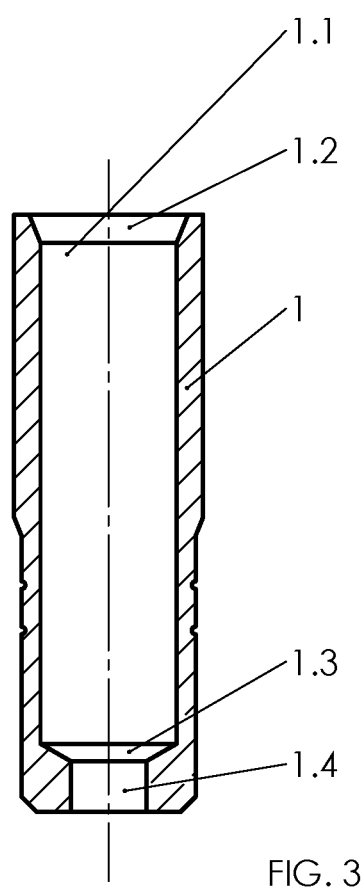

(58) Field of Classification Search
CPC .... B29D 2030/0617; B29D 2030/0658; B29D 2030/1671; B29D 2030/3071; B29D 2030/582; F16K 17/30; F16K 24/04; F16K 24/06
See application file for complete search history.

(56) References Cited

FOREIGN PATENT DOCUMENTS

| WO | WO-2017008925 A1 * | 1/2017 | ............. B29C 33/10 |
| WO | WO-2018011471 A1 * | 1/2018 | ............. B29C 33/10 |

\* cited by examiner

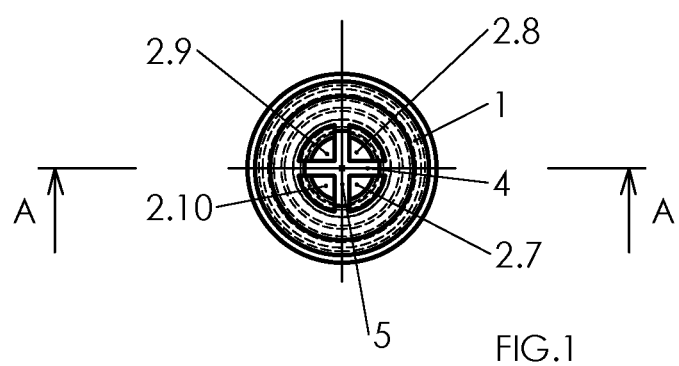
FIG.1
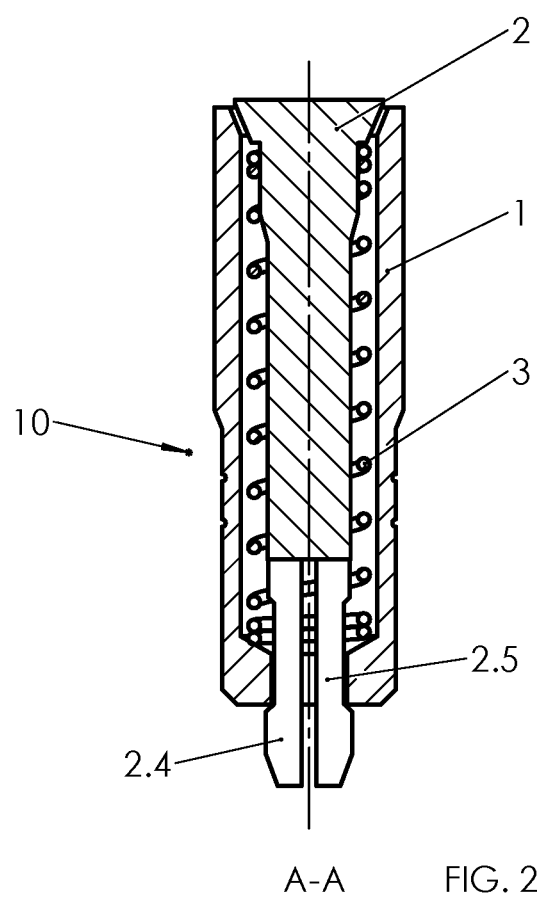
A-A FIG. 2

VENT VALVE FOR VENTING BORES OF VULCANIZATION MOLDS

FIELD OF THE INVENTION

The invention relates to a vent valve for venting bores of vulcanization molds, specifically for the car tire manufacturing.

BACKGROUND OF THE INVENTION

It is known that each mold, used for car tire vulcanization, must be vented to allow a semi-finished car tire, injected into the mold by pressure developed from the side of the mold cavity, to acquire the shape corresponding with the tool, embedded in the vulcanization mold. At the same time, semi-finished product presses forward the air in the direction towards the mold circumference; afterwards, the air escapes from the mold. In doing so, tire material penetrates venting bores, creating cushions (flashes), which must be removed after completion of vulcanization.

Currently used vent valves are grouped into two construction categories, i.e., one-piece (non-demountable), and two-piece (demountable) valves. Manufacture and installation of one-piece valve into the mold is easy; however, its maintenance is rather complicated. To replace the valve, the entire mold must be disassembled; after valve removal, its remaining hole must be bored and the valve, having the larger diameter compared to the replaced valve, must be assembled into the bored hole. In contrast, if demountable two-piece valves are used, a sleeve hole needs not to be bored as valve replacement will only require dismantling of the pin from the sleeve with subsequent replacement.

Nevertheless, dismantling mechanism is oftentimes stressed by repeated assembly and disassembly procedures; consequently, the mechanism is very frequently damaged, which results in pulling-out of the pin out of the sleeve when the vulcanized tire is removed from the vulcanization mold, and subsequent mold defect. Thus, manufacture effectiveness is significantly affected. In addition, escape of the air and impurities trapped within the valve is not optimal as the dismantling mechanism occupies a certain space inside the valve which, should a one-piece spring-loaded valve be used, could be used to release mentioned air and impurities.

The solution, described in DE 10 2016 209 910, is the closest prior art related to the submitted invention, where one groove divides the lower part of the cylindrical part of the vent valve pin into two identical flexible parts-halves. The solution is known from DE 19543276 where two grooves shaping four identical flexible parts, thus forming a collet, divide the lower part of the cylindrical part of the vent valve pin. In both quoted documents, grooves are passing through the lower cylindrical part to the central cylindrical part with a spring placed around, whereas the diameter of the central cylindrical part is slightly smaller (for spring fitting) than the diameter of the lower cylindrical part. Removal of impurities, generated by vulcanization, is routed through a small space around the central cylindrical part to the lower cylindrical hole of the sleeve; therefore, impurities may accumulate in the said space and, consequently, function of the valve may deteriorate or repair may be necessary.

From WO2007/100308 (SK2007/050007)—the issue of easy demountability of the valve is addressed differently. Again, the valve has only one groove, but located on the sleeve. When the groove is installed on the sleeve, its condition can not be verified as the sleeve is pressed inside the mold. The sleeve must be removed from the vulcanization mold to make inspection or replace grooves. As there is only one groove introduced, this segment is heavily stressed and frequently cracks, which may result in pulling-out of the pin out of the sleeve when the vulcanized tire is removed from the vulcanization mold, and subsequent mold defect. Similarly, a hammer and/or press must be used to install the pin into the sleeve.

OBJECT OF THE INVENTION

Vent valve for venting bores of vulcanization molds according to the invention overcomes the above-mentioned shortages of known vent valves. The vent valve includes a sleeve with an inner cylindrical hollow inside, ended with a valve conical hole and a cylindrical hole at the sides; the sleeve may be inserted into the vulcanization mold hole. Furthermore, the vent valve includes a pin, which is movably fitted with the spring in the inner cylindrical hollow. The pin contains a lower cylindrical part, ended with a lower conical part in its lower part, and an upper conical part at the upper part, whereas the lower cylindrical part and the central cylindrical part are divided into four flexible legs, forming a flexible collet. The summary of the invention is that the upper conical part is followed by the central cylindrical part, whereas the diameter of the central cylindrical part is smaller than the connecting cylindrical part, and also with smaller diameter than the lower cylindrical part.

According to the first preferred embodiment, four flexible legs partially reach the connecting cylindrical part, which positively affects assembly of the pin.

The main advantages of the present invention may be summarized as follows:
- improved escape of the air from the vulcanization mold around the central cylindrical part with smaller diameter
- improved removal of impurities generated by vulcanization around the central cylindrical part with smaller diameter
- improved elasticity of flexible legs, passing through the central part with smaller diameter to the connecting cylindrical part, thus achieving longer lifetime of the valve
- simplified assembly and/or disassembly of the pin to the sleeve
- improved accuracy of valve stroke length guaranteed by the flat lower part of the sleeve (flat lower face)

SUMMARY OF FIGURES IN DRAWINGS

Figure 5:
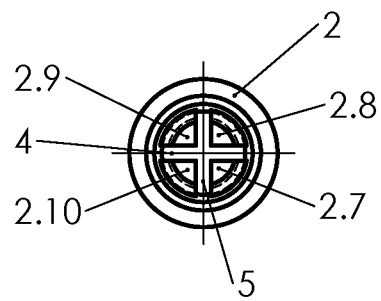
Figure 4:
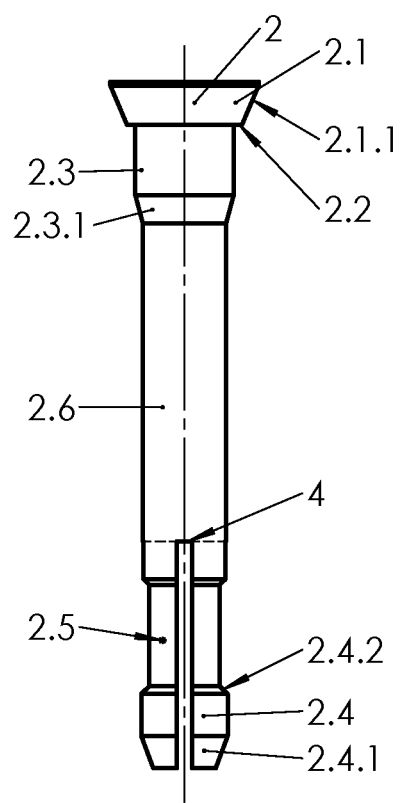
Figure 6:
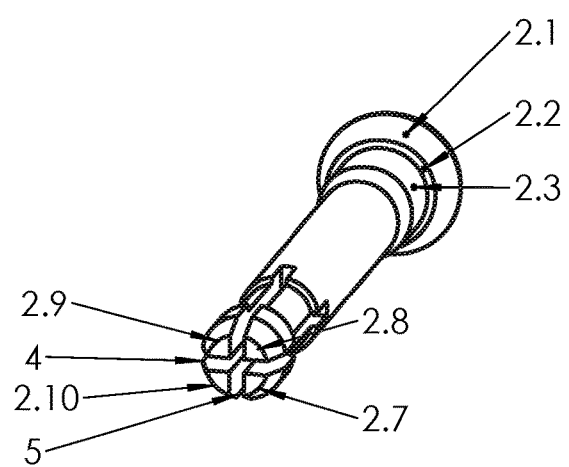
Figure 7:
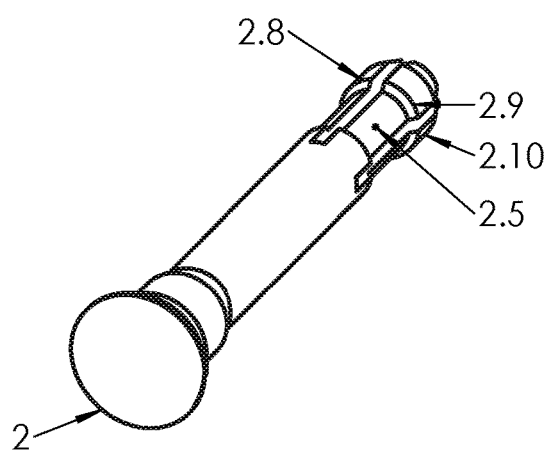

The invention will be explained in more detail by pictures, showing:

FIG. 1 top view of the assembled vent valve
FIG. 2 section A-A of FIG. 1, i.e., vent valve cross section
FIG. 3 vent valve sleeve
FIG. 4 vent valve pin
FIG. 5 top view of the vent valve pin
FIG. 6 spatial view of the pin from its lower part
FIG. 7 spatial view of the pin from its upper part

DESCRIPTION OF EMBODIMENTS

The vent valve, according to the attached pictures in FIGS. 1 to 7, exhausts air from vulcanization molds during vulcanization process. The vent valve 10 consists of a valve sleeve 1, in its inner cylindrical hollow 1.1 is a valve insert-pin 2, movably located on the spring 3.

A valve conical hole 1.2 is on the upper side of the valve sleeve 1 and the inner conical part 1.3 is created in the lower part of the inner cylindrical hollow 1.1, formed by a drill bit used to create the inner cylindrical hollow 1.1. A cylindrical hole 1.4. leads from the inner conical part 1.3 with smaller diameter.

The pin 2 contains a head 2.1 with a conical surface 2.1.1, oriented in the same direction as the valve conical hole 1.2 on the sleeve 1. Under the head 2.1, a shoulder 2.2 is created, followed by an upper cylindrical part 2.3. The upper cylindrical part 2.3 is ended with a conical shoulder 2.3.1. On the lower side, the pin 2 is ended with a lower cylindrical part 2.4, ended with a lower conical part 2.4.1 on the lower part of the cylinder, and with an upper conical part 2.4.2 on the upper part of the cylinder. A central cylindrical part 2.5, followed by a connecting cylindrical part 2.6, follows the upper conical part 2.4.2. The connecting cylindrical part 2.6 leads to the conical shoulder 2.3.1. The central cylindrical part 2.5 has a smaller diameter than the connecting cylindrical part 2.6 as well as the lower cylindrical part 2.4. The first groove 4 and the second groove 5 are taken via the lower cylindrical part 2.4 and the central cylindrical part 2.5, and partially reach the connecting cylindrical part 2.6. These grooves 4 and 5 divide the lower cylindrical part 2.4 and the central cylindrical part 2.5 into four legs 2.7 to 2.10, forming an imaginary collet.

One side of the spring 3 leans against the inner conical part 1.3 and the other against the shoulder 2.2 created under the head 2.1 of the pin 2.

Description of Valve Assembly:

The spring 3 will slide into the pin 2 under the shoulder 2.2 and the pin 2 will slide into the inner cylindrical hollow 1.1 of the sleeve 1 up to the cylindrical hole 1.4. via the valve conical hole 1.2. The lower cylindrical part 2.4.1, involving flexible legs 2.7 to 2.10, passing through better deformable central part 2.5 with smaller diameter, will reduce its diameter to the diameter smaller than the cylindrical hole 1.4 of the sleeve 1. Consequently, the pin 2 will stretch over the cylindrical hole 1.4 on the sleeve 1. In case of maintenance, when the valve 10 does not fulfill its function any more, the pin 2 and the spring 3 may be replaced without any need to remove the sleeve 1 from the mold. Legs 2.7 to 2.10 together with the upper conical part 2.4.2 allow for a demountable connection of the pin 2 and the sleeve 1. The pin 2 may be assembled into the empty valve sleeve 1, which is already seated in the vulcanization mold. Engagement of four legs 2.7 to 2.10 makes use of the hammer and/or press unnecessary to assemble the pin 2 into the sleeve 1. The pin 2 may be pressed into the sleeve valve 1 by pushing-in the pin by the hand.

Valve Function Description:

Assembled vent valve 10 is introduced to the hole of non-displayed vulcanization mold. Air, trapped in the vulcanization mold, is pressed by a rubber compound. The spring 3, pressing the head 2.1 of the pin 2 out of the valve conical hole 1.2 of the valve sleeve 1, helps the air to escape from the vulcanization mold through the space created between the valve conical hole 1.2 of the valve sleeve 1 and the conical surface 2.1.1 of the head 2.1 of the pin 2 in the upper part of the vent valve 10; in addition, the air escapes from the lower part of the valve 10 through the collet, formed by the legs 2.7 to 2.10, and through the space created between the cylindrical hole 1.4 and the central cylindrical part 2.5.

After exhaustion of the air out of the vulcanization mold, the rubber compound presses the conical surface 2.1.1 of the head 2.1 of the pin 2 towards the valve conical hole 1.2 of the sleeve 1. The contact between both conical parts 1.2 and 2.1.1 prevents penetration of rubber compound into the vent valve 10. When the vulcanized tire is removed from the vulcanization mold, the valve 10 opens again as no back-pressure, pushing the valve 10 into the closed position, is developed. The entire cycle may be then repeated again. Pulling-out of the pin 2 out of the sleeve 1 is not possible over the cycle as the diameter of the lower cylindrical part 2.4 is larger than the diameter of the cylindrical hole 1.4.

LIST OF REFERENCE SIGNS 1 valve sleeve
1.1 inner cylindrical hollow
1.2 valve conical hole
1.3 inner conical part
1.4 cylindrical hole
2 pin
2.1 head of the pin
2.1.1 conical surface of the head of the pin
2.2 shoulder
2.3 upper cylindrical part
2.3.1 conical shoulder of the upper cylindrical part
2.4 lower cylindrical part
2.4.1 lower conical part
2.4.2 upper conical part
2.5 central cylindrical part
2.6 connecting cylindrical part
2.7 to 2.10 legs
3 spring
4 first groove
5 second groove

The invention claimed is:

1. A vent valve (10) for vent holes of vulcanization molds, consisting of:
   a sleeve (1), through which passes an inner cylindrical hollow (1.1), said sleeve includes a valve conical hole (1.2) at a first end and a cylindrical hole (1.4) at a second end;
   a pin (2) movably fitted with a spring (3) in the inner cylindrical hollow (1.1), the pin (2) contains a lower cylindrical part (2.4), a central cylindrical part (2.5) and a connecting cylindrical part (2.6);
   wherein said lower cylindrical part includes a lower conical part (2.4.1) and an upper conical part (2.4.2) which is coupled to the central cylindrical part (2.5);
   wherein the lower cylindrical part (2.4) and the central cylindrical part (2.5) are divided into four flexible legs (2.7 to 2.10) identically shaped, forming a flexible collet;
   wherein diameter of the central cylindrical part (2.5) is smaller than diameter of the connecting cylindrical part (2.6) as well as diameter of the lower cylindrical part (2.4); and
   wherein the four flexible legs (2.7 to 2.10) partially reach into the connecting cylindrical part (2.6).

* * * * *